US011425315B2

(12) United States Patent
Zhu et al.

(10) Patent No.: US 11,425,315 B2
(45) Date of Patent: Aug. 23, 2022

(54) VIDEO COMMUNICATIONS METHOD AND APPARATUS, TERMINAL, AND COMPUTER-READABLE STORAGE MEDIUM

(71) Applicant: TENCENT TECHNOLOGY (SHENZHEN) COMPANY LIMITED, Shenzhen (CN)

(72) Inventors: Ying Zhu, Shenzhen (CN); Chao Wang, Shenzhen (CN); Yinglei Liang, Shenzhen (CN); Haoqi Kuang, Shenzhen (CN); Lin Shi, Shenzhen (CN); Jinjie Wang, Shenzhen (CN); Weisong Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 291 days.

(21) Appl. No.: 16/779,770

(22) Filed: Feb. 3, 2020

(65) Prior Publication Data

US 2020/0177823 A1 Jun. 4, 2020

Related U.S. Application Data

(63) Continuation of application No. PCT/CN2018/097177, filed on Jul. 26, 2018.

(30) Foreign Application Priority Data

Aug. 3, 2017 (CN) .......................... 201710656897.7

(51) Int. Cl.
*H04N 5/262* (2006.01)
*G06F 3/01* (2006.01)
(Continued)

(52) U.S. Cl.
CPC .......... *H04N 5/2621* (2013.01); *G06F 3/017* (2013.01); *G06T 11/60* (2013.01); *G06V 40/165* (2022.01);
(Continued)

(58) Field of Classification Search
USPC ................... 348/14.1, 239, 251, 274, 333.05
See application file for complete search history.

(56) References Cited

U.S. PATENT DOCUMENTS

2009/0271705 A1 10/2009 Sheng et al.
2009/0313014 A1* 12/2009 Shin ........................ G10L 15/22
704/235
(Continued)

FOREIGN PATENT DOCUMENTS

CN     101287093    *  5/2008 ............. H04L 29/12
CN     101287093 A    10/2008
(Continued)

OTHER PUBLICATIONS

The World Intellectual Property Organization (WIPO) International Search Report for PCT/CN2018/097177 Nov. 5, 2018 5 Pages (including translation).

*Primary Examiner* — Yosef K Laekemariam
(74) *Attorney, Agent, or Firm* — Anova Law Group, PLLC

(57) ABSTRACT

A video communications method is provided, including: respectively displaying video images of at least two terminals in at least two display subareas of a video communication interface in a video chat session of the at least two terminal; obtaining a first special effect display instruction; and adding a first special effect to the at least two display subareas based on the first special effect display instruction. The method also includes transmitting the first special effect display instruction to a second terminal of the at least two terminals, the second terminal being an action recipient of (Continued)

the first special effect; and selecting, among multiple end special effects, a target end special effect to be added to the video images of the at least two terminals according to a body action occurred in the video image of the second terminal.

20 Claims, 11 Drawing Sheets

(51) Int. Cl.
*G06T 11/60* (2006.01)
*H04N 7/14* (2006.01)
*G06V 40/16* (2022.01)

(52) U.S. Cl.
CPC ........... *G06V 40/166* (2022.01); *H04N 7/141* (2013.01); *H04N 2007/145* (2013.01)

(56) References Cited

U.S. PATENT DOCUMENTS

2014/0282086 A1* 9/2014 Shi ................... H04N 21/4316
715/752
2017/0168628 A1* 6/2017 Yin ...................... G06F 3/0481

FOREIGN PATENT DOCUMENTS

| CN | 105578113 A | 5/2016 |
| CN | 106331880 A | 1/2017 |

\* cited by examiner

VIDEO COMMUNICATIONS METHOD AND APPARATUS, TERMINAL, AND COMPUTER-READABLE STORAGE MEDIUM

CROSS-REFERENCES TO RELATED APPLICATIONS

This application is a continuation application of PCT Patent Application No. PCT/CN2018/097177, filed on Jul. 26, 2018, which claims priority to Patent Application No. 201710656897.7, filed on Aug. 3, 2017 and entitled "VIDEO COMMUNICATIONS METHOD AND APPARATUS, TERMINAL, AND COMPUTER-READABLE STORAGE MEDIUM".

FIELD OF TECHNOLOGY

This application relates to the field of network technologies, and in particular, to a video communications method and apparatus, a terminal, and a computer-readable storage medium.

BACKGROUND OF THE DISCLOSURE

With developments of communication technologies, video communication gradually becomes a common communication means. A social application installed in a terminal is usually provided with a video communication or video chat function, and a user can perform video communication with a friend user through the social application, so that information exchange between users is facilitated, and authenticity of information exchange is improved.

In existing technology, in a case that a first terminal performs video communication with a second terminal, the first terminal records and transmits first video data to the second terminal. The first terminal receives second video data transmitted by the second terminal, and displays video images corresponding to the first video data and the second video data through a display manner of big and small pictures, such as displaying a video image of the second video data in full screen in a current screen, and displaying a video image of the first video data in a small size in a rectangular area in an upper right corner of the current screen.

In the foregoing method, when interaction is performed between a first user and a second user, one user is limited by a size of a picture occupied by the other user in the current screen. Because of the limitation of pictures, in a case that a special effect needs to be added, the special effect can only be added to the video image occupying the bigger picture, which lacks a sense of interaction, wastes network resources of video communication, and greatly reduces actual efficiency of video communication.

SUMMARY

To resolve the problem in the related art, embodiments of this application provide a video communications method and apparatus, a terminal, and a computer-readable storage medium. The technical solutions are as follows:

According to a first aspect, a video communications method is provided. The method is applied to a first terminal and includes: respectively displaying video images of at least two terminals in at least two display subareas of a video communication interface in a video chat session of the at least two terminals. The at least two terminals includes the first terminal, and each display subarea displays a video image from one of the at least two terminals. The method also includes: obtaining a first special effect display instruction; adding a first special effect to the at least two display subareas based on the first special effect display instruction; transmitting the first special effect display instruction to a second terminal of the at least two terminals, the second terminal being an action recipient of the first special effect; and selecting, among multiple end special effects, a target end special effect to be added to the video images of the at least two terminals according to a body action occurred in the video image of the second terminal. The multiple end special effects indicate different action results of the first special effect corresponding to different body actions.

According to a second aspect, a first terminal is provided. The terminal includes a processor and a memory, the memory storing at least one instruction, and the instruction being loaded and executed by the processor to perform: respectively displaying video images of at least two terminals in at least two display subareas of a video communication interface in a video chat session of the at least two terminal. The at least two terminals includes the first terminal, and each display subarea displays a video image from one of the at least two terminals. The processor is also configured to perform: obtaining a first special effect display instruction; adding a first special effect to the at least two display subareas based on the first special effect display instruction; transmitting the first special effect display instruction to a second terminal of the at least two terminals, the second terminal being an action recipient of the first special effect; and selecting, among multiple end special effects, a target end special effect to be added to the video images of the at least two terminals according to a body action occurred in the video image of the second terminal. The multiple end special effects indicate different action results of the first special effect corresponding to different body actions.

According to a third aspect, a non-transitory computer-readable storage medium is provided. The computer-readable storage medium stores at least one instruction, the instruction being loaded and executed by a processor of a first terminal to perform respectively displaying video images of at least two terminals in at least two display subareas of a video communication interface in a video chat session of the at least two terminal. The at least two terminals includes the first terminal, and each display subarea displays a video image from one of the at least two terminals. The instruction further cause the processor to perform: obtaining a first special effect display instruction; adding a first special effect to the at least two display subareas based on the first special effect display instruction; transmitting the first special effect display instruction to a second terminal of the at least two terminals, the second terminal being an action recipient of the first special effect; and selecting, among multiple end special effects, a target end special effect to be added to the video images of the at least two terminals according to a body action occurred in the video image of the second terminal. The multiple end special effects indicate different action results of the first special effect corresponding to different body actions.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

Figure 1:
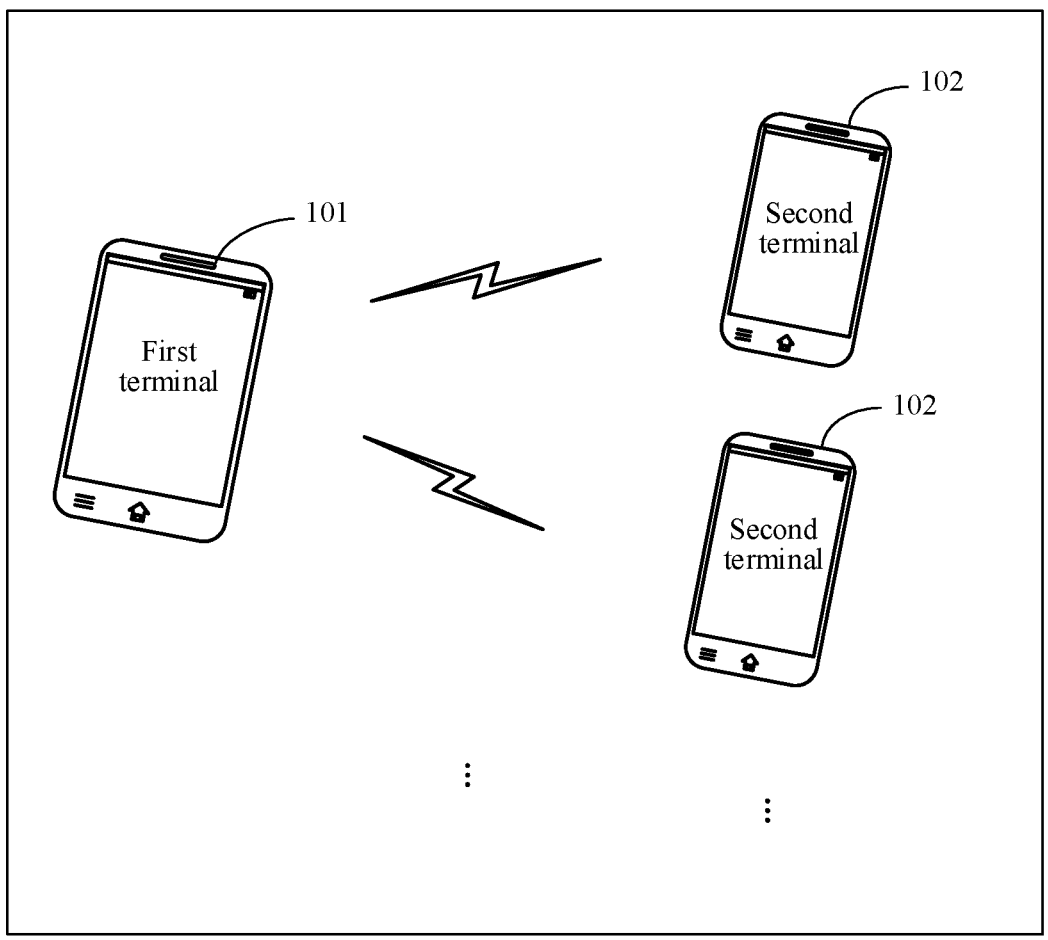
FIG. 1 is a schematic diagram of an implementation environment according to an embodiment of this application.

FIG. 1 is a schematic diagram of an implementation environment according to an embodiment of this application. The implementation environment includes: a first terminal 101, and at least one second terminal 102 performing video communication with the first terminal. In a video chat session of the first terminal 101 and the at least one second terminal 102, the first terminal 101 transmits a video image of the first terminal 101 to the at least one second terminal 102, receives a video image of the second terminal 102 transmitted by the at least one second terminal 102, and displays the video image of the first terminal 101 and the video image of the at least one second terminal 102 through a split-screen display manner in a video communication interface. The split-screen display manner includes: the first terminal 101 respectively displays video images of at least two terminals in at least two display subareas of the video communication interface, the display subareas being not overlapped. In some embodiments, the at least two display subareas have substantially the same size. The first terminal 101 respectively displays the video images of the at least two terminals in the at least two display subareas according to shapes and sizes of the at least two display subareas in the video communication interface.

Figure 2A:
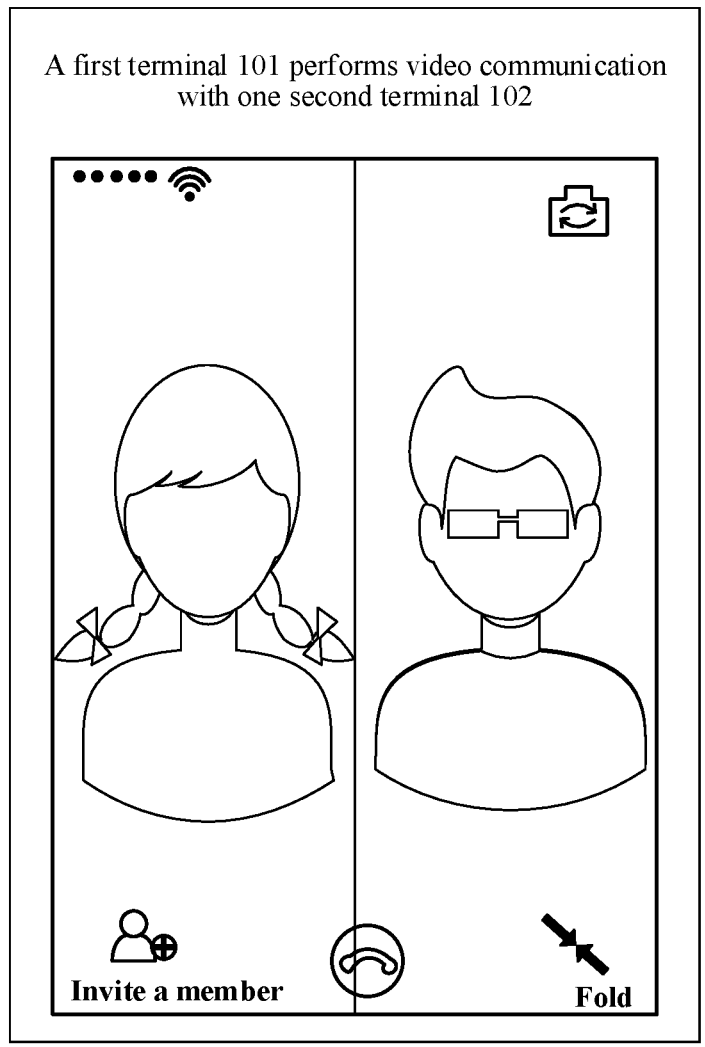
FIG. 2A is a schematic diagram of a split-screen display manner according to an embodiment of this application.
Figure 2B:
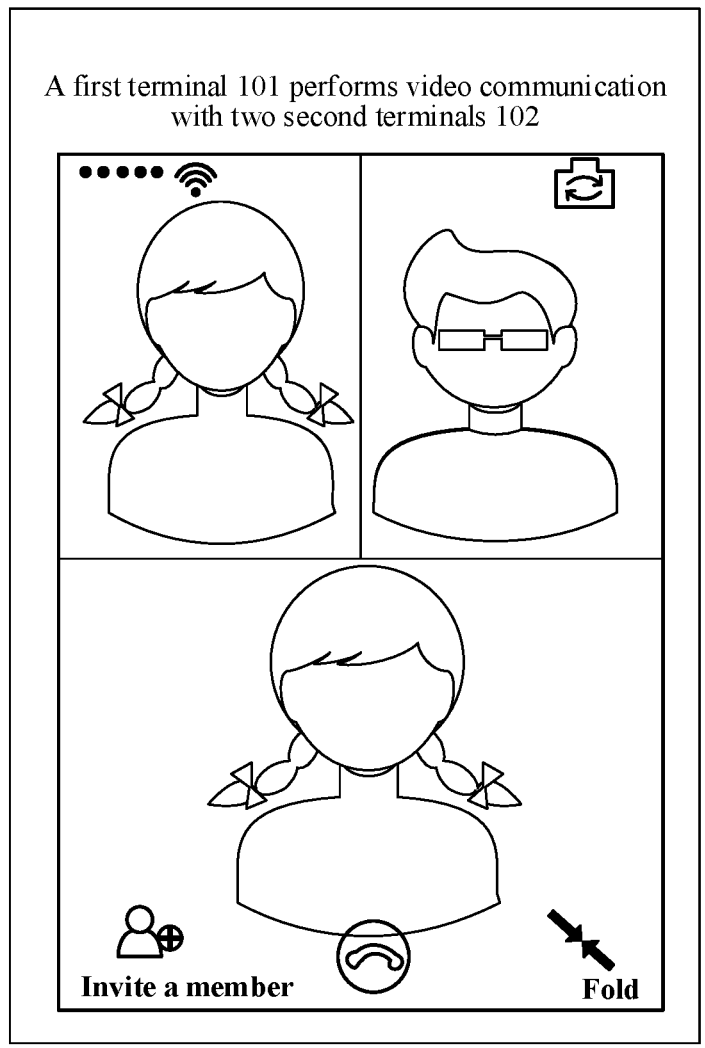
FIG. 2B is a schematic diagram of a split-screen display manner according to an embodiment of this application.
Figure 2C:
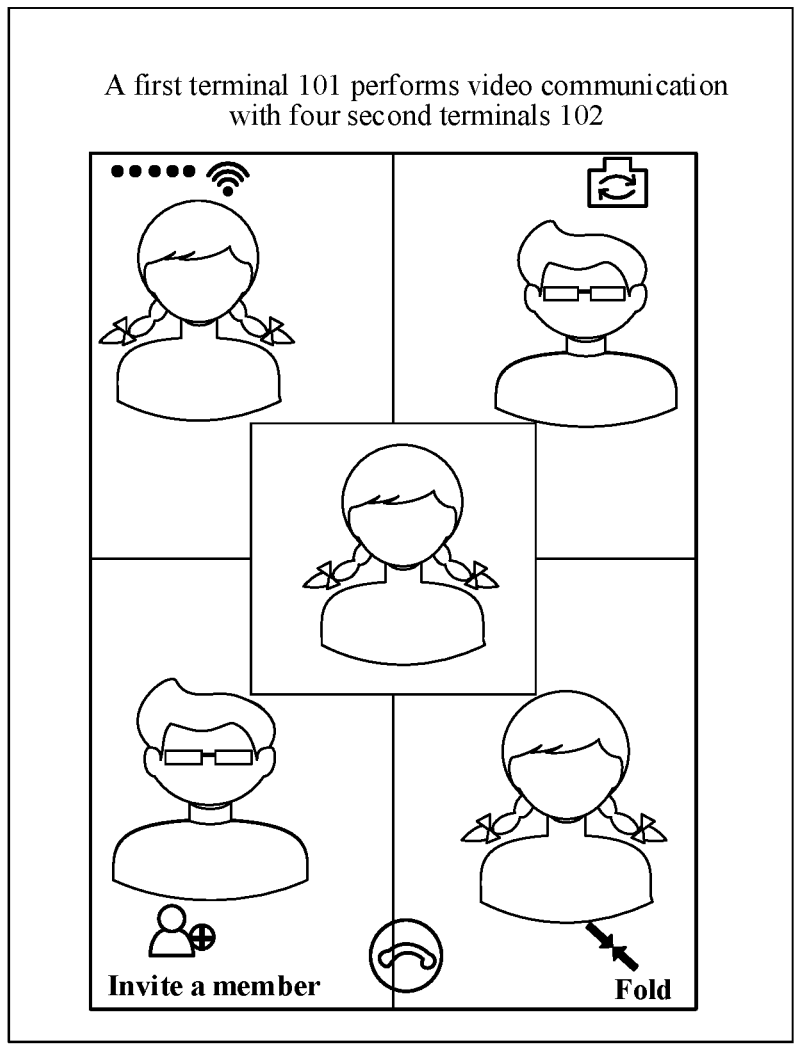
FIG. 2C is a schematic diagram of a split-screen display manner according to an embodiment of this application.

Taking that the first terminal 101 performs video communication with one second terminal 102 as an example, as shown in FIG. 2A, a video communication interface of the first terminal 101 includes two rectangular display subareas with the same size that are arranged side by side from left to right, the video image of the first terminal 101 and the video image of the second terminal 102 being respectively displayed in the two rectangular display subareas. Alternatively, the video communication interface of the first terminal 101 includes rectangular display subareas with the same size that are arranged side by side vertically, the video image of the first terminal 101 and the video image of the second terminal 102 being respectively displayed in the rectangular display subareas. Certainly, subareas that display the video images of the terminals can be specifically adjusted by a terminal user according to a using habit of the terminal user. Taking that the first terminal 101 performs video communication with two second terminals 102 as an example, as shown in FIG. 2B, an upper half area of the video communication interface of the first terminal 101 includes two rectangular display subareas with the same size that are arranged side by side, and a lower half area includes one rectangular display subarea. The video image of the first terminal 101 and video images of the two second terminals 102 are respectively displayed in the three rectangular display subareas obtained through division. Alternatively, the video communication interface of the first terminal 101 includes three rectangular display subareas with the same size that are arranged side by side transversely, the video image of the first terminal 101 and the video images of the two second terminals 102 being respectively displayed in the three rectangular display subareas. Certainly, in the video chat session, subareas that display the video images of the terminals can be specifically adjusted by a terminal user according to a using habit of the terminal user. Taking that the first terminal 101 performs video communication with four second terminals 102 as an example, as shown in FIG. 2C, the video communication interface of the first terminal 101 can display the display subareas in a manner of modular window display. Actually, in a case that the display subareas are displayed in the manner of modular window display, the display subareas can be not overlapped. The video communication interface includes a rectangular display subarea located in a center area and four polygonal display subareas surrounding the center area. In the five display subareas obtained through division, the video image of the first terminal 101 and the video images of the four second terminals 102 are respectively displayed. Certainly, in the video chat session, subareas that display the video images of the terminals can be specifically adjusted by a terminal user according to a using habit of the terminal user.

Special effects related in one embodiment of this application include a pendant special effect and a cross-subarea special effect. The pendant special effect is a special effect displayed based on facial coordinates, for example, the pendant special effect displays big red lips on a mouth of a video image based on a mouth location of the facial coordinates, or displays cat ears over a head based on a head location of the facial coordinates. The pendant special effect in one embodiment of this application is a special effect for the video images of the at least two display subareas, that is, a special effect that is added for the video images of the at least two display subareas at the same time. For example, in a case that two terminals perform video communication, a pendant special effect option can be provided, the pendant special effect option corresponding to at least two included pendant special effects, one pendant special effect being a cat model and another pendant special effect being a dog model. In a case that the first terminal chooses to add the pendant special effect, cat ears and a cat nose can be added for a face in a first display subarea, and dog ears and a dog nose can be added for a face in a second display subarea. The addition of the special effect can actually be a procedure of adding a layer on the displayed video image and performing drawing based on obtained special effect parameters. The special effect parameters include, but are not limited to line parameters, color parameters, moving track parameters, and the like.

The interaction between the first terminal 101 and the at least one second terminal 102 is actually performed through a server, and the server serves as a relay of video data and instructions. In this embodiment of this application, to simplify an interaction procedure between the first terminal 101 and the at least one second terminal 102, a procedure related to the server in the interaction procedure is not specifically described again.

Figure 3:
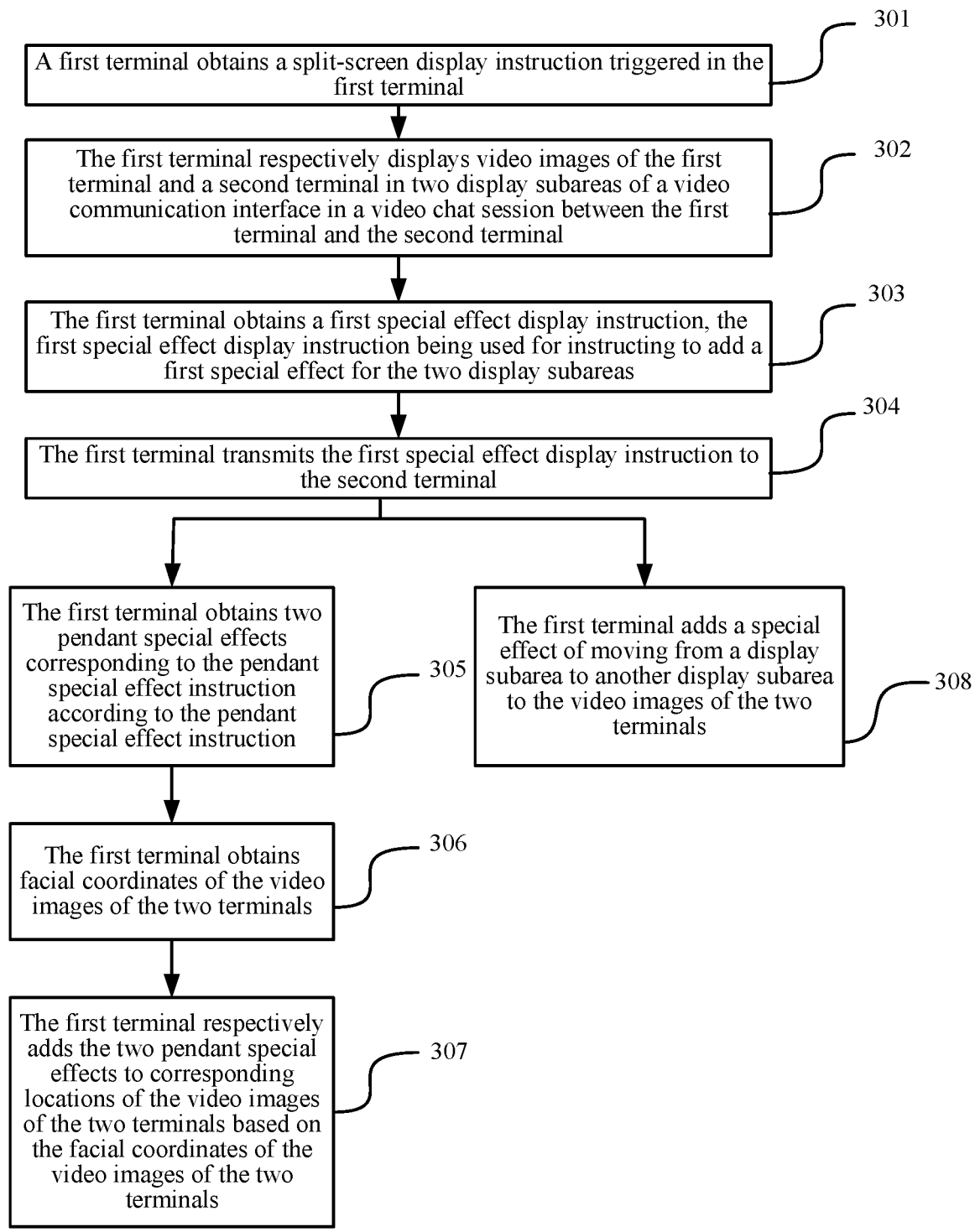
FIG. 3 is a flowchart of a video communications method according to an embodiment of this application.

For ease of understanding of principles of this application, in an embodiment of this application, only the performing video communication between two terminals is used as an example for description. FIG. 3 is a flowchart of a video communications method according to an embodiment of this application. Referring to FIG. 3, the method includes the following steps:

301: A first terminal obtains a split-screen display instruction triggered in the first terminal.

The split-screen display instruction is used for instructing the first terminal to display video images of two terminals in a manner of split-screen display. In one embodiment of the present disclosure, the specific manner of split-screen display is: dividing the video communication interface into two rectangular display subareas with the same size that are arranged side by side from left to right, and each of the display subareas is used for displaying a video image of a participating terminal in video communication.

The foregoing procedure of obtaining the split-screen display instruction is described by using an example that the first terminal triggers the split-screen display instruction though an operation in the current terminal. A specific triggering manner includes: in a video chat session of the first terminal and a second terminal, the first terminal displays a split-screen button on the video communication interface, and in a case that the first terminal detects that the split-screen button is triggered, the first terminal generates the split-screen display instruction, so that the first terminal obtains the split-screen display instruction of the first terminal. Further, to enable the participating terminals of video communication to maintain a consistent display effect, after obtaining the split-screen display instruction of the first terminal, the first terminal transmits the split-screen display instruction to the second terminal, the split-screen display instruction transmitted by the first terminal to the second terminal being used for instructing the second terminal to display the video image of the first terminal and a video image of the second terminal through a manner of split-screen display. In a case that the second terminal receives the split-screen display instruction, split-screen display can be performed.

Certainly, a manner of obtaining the split-screen display instruction can further include that the second terminal initiates screen splitting, and the first terminal receives a split-screen display instruction transmitted by the second terminal. In the video chat session of the first terminal and the second terminal, in a case that the second terminal detects that a split-screen button of a video communication interface of the second terminal is triggered, the second terminal generates the split-screen display instruction. In addition, the second terminal transmits the split-screen display instruction to the first terminal, and the first terminal receives the split-screen display instruction transmitted by the second terminal.

The split-screen display instruction may be an instruction jointly triggered by an interaction special effect button and the split-screen button. A specific procedure is: after opening the video communication interface, the first terminal displays an interaction special effect button in the video communication interface, and in a case that the first terminal detects that the interaction special effect button is triggered, the first terminal displays a plurality of special effect buttons, and displays a split-screen display button used for triggering the split-screen display instruction. In a case that the first terminal detects that the split-screen display button is triggered, the first terminal obtains the split-screen display instruction. Certainly, the split-screen display instruction may be further an instruction directly triggered by the split-screen button. A specific procedure includes: the first terminal directly displays the split-screen button in the video communication interface, and in a case that the first terminal detects that the split-screen button is triggered, the first terminal obtains the split-screen display instruction.

Which specifically initiates screen splitting is not specifically limited in this embodiment of this application. Certainly, in one embodiment of this application, descriptions are performed by taking an example that a display manner is switched into split-screen display in the video chat session, and in an actual scenario, in a case that the video chat session is triggered, the video chat session can be performed by directly using split-screen display without a conversion operation. For example, in a case that video communication is initiated, the terminal user can directly select the display manner used in video communication, thereby initiating corresponding video communication. Further, the split-screen display instruction may be further used for indicating how to specifically perform screen splitting on the video communication interface, and in a case that the first terminal receives the split-screen display instruction, the first terminal can perform split-screen display based on different indicated screen splitting manners.

Certainly, for the second terminal, in a case that the first terminal initiates split-screen display, but a user of the second terminal does not intend to perform split-screen display, the display manner can be switched back to the display manner of big and small pictures (e.g., unevenly-sized pictures, for example, one video image is displayed in full screen, and another video image is displayed overlapping a subarea of the full screen) through an operation of the user after screen splitting, or, in a case that the second terminal receives the split-screen display instruction of the first terminal, a selection option can be displayed, the selection option being used for prompting the user of the second terminal to determine whether to switch to a split-screen display manner. In a case that the second terminal detects that the user chooses to perform no switching, switching is not performed, and in a case that the user chooses to perform switching, a subsequent split-screen display procedure is performed.

302: The first terminal respectively displays video images of the first terminal and a second terminal in two display subareas of a video communication interface in a video chat session of the first terminal and the second terminal. Each display subarea is configured to display a video image from one of the two terminals.

In a case that the split-screen display instruction is received, the first terminal can divide the video communication interface according to the split-screen display manner indicated by the split-screen display instruction, to obtain two display subareas. The two display subareas are not overlapped, and video data decoding is performed on original video data of the first terminal and original video data of the second terminal according to shapes and sizes of the two display subareas, to obtain video images matching the two display subareas. A video image of the first terminal (e.g., obtained by decoding a video data or obtained from an embedded camera) is displayed in a first display subarea, and a video image of the second terminal (e.g., obtained by decoding a video data transmitted from the second terminal or from a server) is displayed in a second display subarea. In the foregoing procedure, descriptions are performed by taking an example that the video images are adjusted by adjusting decoding parameters, and in an actual scenario, the video images obtained by decoding may be adjusted based on an original decoding manner. For example, a length and a width of a video image is cropped or stretched according to the same proportion, to obtain video images matching two display subareas, so that the video images in the display subareas match an actual face of a user in proportion. Certainly, an adjustment manner that is specifically used is not limited in this embodiment of this application.

Figure 4:
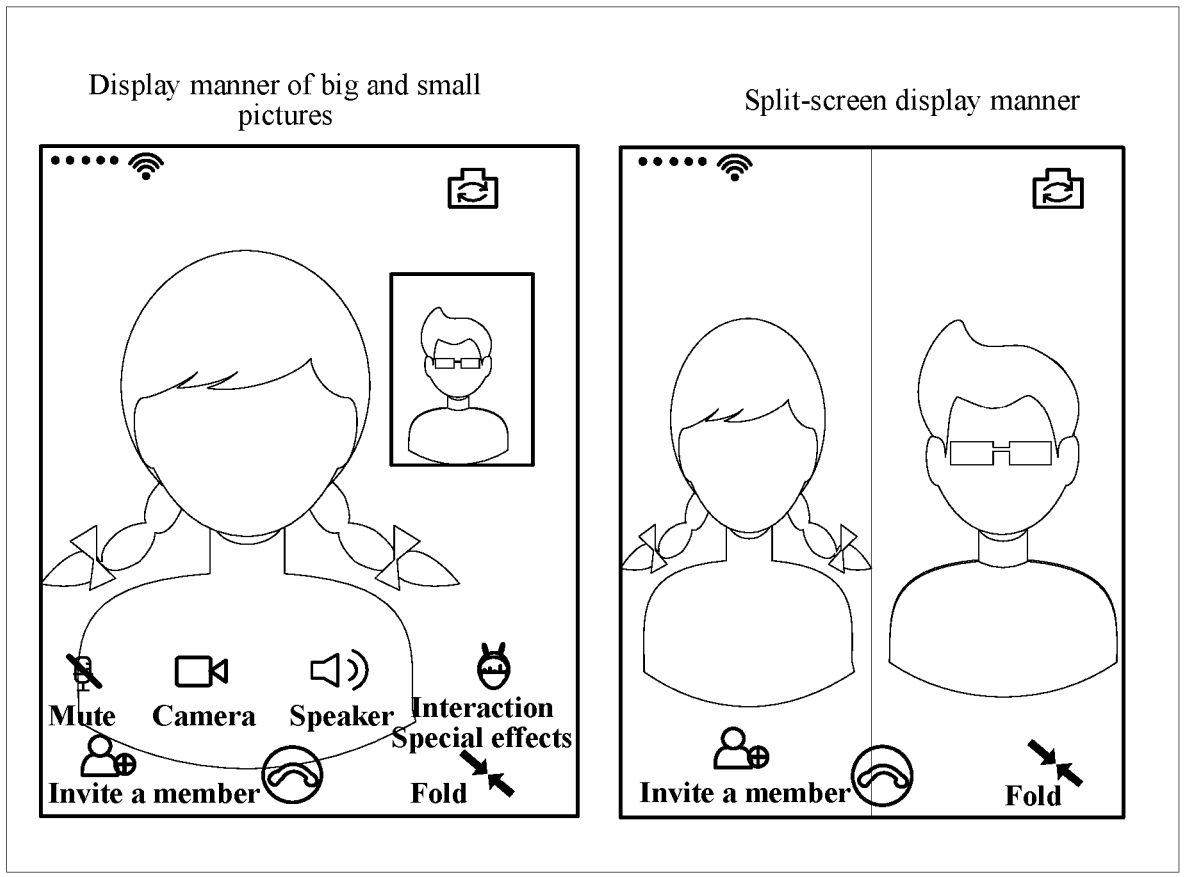
FIG. 4 is a schematic diagram of a split-screen display manner according to an embodiment of this application.

In one embodiment of this application, arrangement manners, shapes and sizes of the first display subarea and the second display subarea in the video communication interface may be preset by a system, or may be set and modified based on a user requirement. This is not specifically limited in this embodiment of this application. For example, the first display subarea and the second display subarea can be two rectangular display subareas with the same size that are arranged side by side in the video communication interface, or two rectangular display subareas with the same size that are arranged vertically in the video communication interface. A screen layout of equally dividing a screen from left to right can provide the user with a psychological sense of company of "being together", and in addition, bring more possibilities to an idea of left and right cross-screen interaction. Alternatively, the first display subarea and the second display subarea can be two rectangular display subareas that are arranged side by side in the video communication interface, a proportion of sizes of the display subareas in the video communication interface being 3:2, and the like. For example, as shown in FIG. 4, the first terminal respectively displays the video image of the first terminal and the video image of the second terminal in two rectangular display subareas with the same size that are arranged side by side in the video communication interface. The video images of the two terminals are displayed through the split-screen display manner, so that the user can see the face in the video image more clearly, thereby improving a user experience in video communication.

303: The first terminal obtains a first special effect display instruction, the first special effect display instruction being used for instructing to add a first special effect to the two display subareas.

In the foregoing procedure of obtaining the first special effect display instruction, the first special effect display instruction may be obtained by triggering the video communication interface by the user. In this step, the first terminal can display a plurality of special effect buttons in the video communication interface, the special effect buttons corresponding to different special effects, so that the user can trigger the first special effect display instruction through an operation of triggering any one of the special effect buttons, to add a corresponding special effect. The procedure relates to a manual operation of the user on the video communication interface, and a specific procedure may be as follows:

The plurality of special effect buttons may include a plurality of pendant special effect buttons and a plurality of cross-subarea special effect buttons. In a case that the first terminal detects that a pendant special effect button is triggered, the first terminal obtains a pendant special effect instruction corresponding to the pendant special effect button, the pendant special effect instruction being used for instructing the first terminal to add the pendant special effect for the two display subareas; and in a case that the first terminal detects that a cross-subarea special effect button is triggered, the first terminal obtains a cross-subarea special effect instruction corresponding to the cross-subarea special effect button, the cross-subarea special effect instruction being used for instructing the first terminal to add a cross-subarea special effect for the two display subareas.

In the foregoing procedure of obtaining the first special effect display instruction, the first special effect display instruction may be obtained by triggering by a gesture operation or an emotion change of the user. In this step, the first terminal may further trigger the first special effect display instruction through a specified gesture or a specified emotion in the video images of the two terminals.

Taking the gesture operation as an example, a step that the first terminal obtains the first special effect display instruction can be: in a case that the first terminal detects that there is the specified gesture in both video images displayed in the two display subareas, the first terminal obtains a gesture special effect instruction corresponding to the specified gesture, the gesture special effect instruction being used for instructing to add a special effect corresponding to the specified gesture for the video images displayed in the two display subareas. In this step, the first terminal identifies a gesture operation in the video image of the first terminal and a gesture operation in the video image of the second terminal through a first preset identification algorithm, and determines whether the two gesture operations are the specified gesture. In a case that the two gesture operations are the specified gesture, the first terminal obtains the gesture special effect instruction corresponding to the specified gesture; otherwise, the first terminal does not obtain any gesture special effect instruction.

The first terminal may preset and store a track parameter and a shape parameter of the specified gesture, the track parameter and the shape parameter of the specified gesture can be set and modified based on a user requirement. This is not specifically limited in this embodiment of this application. For example, the specified gesture can be a heart-shaped gesture formed by a hand heart in the video image of the first terminal and the video image of the second terminal, that is, in a case that the first terminal detects that the heart-shaped gesture is performed by both parties in a call in the video images, the first terminal determines that the specified gesture is detected, and triggers the first special effect display instruction, to add a corresponding special effect to the two display subareas.

Taking the emotion change as an example, a step that the first terminal obtains the first special effect display instruction can be: in a case that the first terminal detects that there is the specified emotion in any one of the video images displayed in the two display subareas, the first terminal obtains an emotion special effect instruction corresponding to the specified emotion, the emotion special effect instruction corresponding to the specified emotion being used for instructing to add a special effect corresponding to the specified emotion for the video images displayed in the two display subareas. In this step, the first terminal obtains an emotion feature corresponding to the specified emotion, extracts a plurality of emotion features in faces in the video image of the first terminal and the video image of the second terminal through a second preset identification algorithm, and determines whether there is the specified emotion in the faces according to the plurality of emotion features and the emotion feature corresponding to the specified emotion. In a case that there is the specified emotion in the faces, the first terminal obtains the emotion special effect instruction corresponding to the specified emotion; otherwise, the first terminal does not obtain any emotion special effect instruction.

The first terminal may preset and store the emotion feature corresponding to the specified emotion. The specified emotion may be set and modified based on a user requirement. This is not specifically limited in this embodiment of this application. For example, the specified emotion may be a facial emotion corresponding to an action of "Muah" (e.g., kissing). The first preset identification algorithm and the second preset identification algorithm can be set and modified based on a user requirement. This is not specifically limited in this embodiment of this application. For example, the first preset identification algorithm can be an image identification algorithm based on standard pixels, and the second preset identification algorithm can be a feature extraction algorithm.

Controlling addition of special effects through changes of gestures or emotions can provide a more convenient operation manner, in which the user does not need to perform triggering manually, thereby greatly improving operating efficiency.

The first special effect display instruction may be further a voice instruction given by the user, that is, the user may instruct the terminal to add the special effect through a manner of speaking. For example, the first terminal may detect the first special effect display instruction in a form of a voice instruction through a microphone, and continue to perform step 304 and subsequent steps. Controlling addition of special effects through the voice instruction can provide a more convenient operation manner, in which the user does not need to perform triggering manually, thereby greatly improving operating efficiency.

Different special effects can be provided for different split-screen display manners. For example, for the scenario of performing display from left to right in one embodiment of this application, a two-person pendant special effect or a cross-subarea special effect crossing two display subareas can be provided. If display is performed in four squares in a four-person call scenario, a four-person pendant special effect or a cross-subarea special effect crossing four display subareas or a cross-subarea special effect crossing two display subareas can be provided. Specifically, when a split-screen display instruction is received, a special effect button corresponding to the screen splitting manner can be obtained when screen splitting is performed according to the split-screen display instruction, and the special effect button can be displayed in the video communication interface of split-screen display.

304: The first terminal transmits the first special effect display instruction to the second terminal.

In one embodiment of this application, to make the participating terminals of video communication consistent, after receiving the first special effect display instruction, the first terminal transmits the first special effect display instruction to the second terminal. After receiving the first special effect display instruction, the second terminal then adds a first special effect corresponding to the first special effect display instruction for the video communication interface of the second terminal according to the first special effect display instruction. A specific procedure of adding, by the second terminal, the special effect based on the instruction is the same as that of the first terminal, which is not described herein again. Certainly, to provide a more flexible interaction manner, and prevent blocking caused by the addition of the special effect, the added special effect can be further canceled. The cancelation can be initiated by any one of the participating terminals of video communication. For example, after the first terminal has added a special effect, when the special effect button is pressed again, a special effect cancelation instruction is triggered. Then the first terminal can cancel the added special effect, and transmit the special effect cancelation instruction to the second terminal, so that the second terminal also cancels the added special effect.

In one embodiment of this application, when the first special effect display instruction is obtained, the first special effect display instruction can be transmitted to the second terminal when the first terminal adds the special effect based on the first special effect display instruction. Certainly, to improve consistency of video communication, the first special effect display instruction can be transmitted to the second terminal as soon as the first special effect display instruction is obtained, to prevent a delay time from being too long.

In one embodiment of this application, the special effect instructions can be classified into a pendant special effect instruction and a cross-subarea special effect instruction, respectively used for instructing to add a pendant special effect and a cross-subarea special effect. When the first special effect display instruction is the pendant special effect instruction, the first special effect is the pendant special effect, and correspondingly, the step that the first terminal adds the pendant special effect for the two display subareas can be implemented through the following step 305 to step 307.

305: The first terminal obtains two pendant special effects corresponding to the pendant special effect instruction according to the pendant special effect instruction.

The pendant special effect instruction is used for instructing the first terminal to add a pendant special effect for each of the video images of the two terminals in the video communication interface. Therefore, each pendant special effect instruction corresponds to two pendant special effects. In one embodiment of this application, each pendant special effect instruction corresponds to two pendant special effects, including a first pendant special effect of the video image of the first terminal and a second pendant special effect of the video image of the second terminal.

In this step, the first terminal locally pre-stores a plurality of correspondences between the pendant special effect instructions and the pendant special effects. Therefore, this step may be: obtaining, by the first terminal, the first pendant special effect and the second pendant special effect corresponding to the pendant special effect instruction from the plurality of correspondences between the pendant special effect instructions and the pendant special effects according to the pendant special effect instruction. In one embodiment of this application, each of the first pendant special effect and the second pendant special effect can be a set of a group of sub-pendants, and each sub-pendant may be a pendant matching an organ on the face. By adding the first pendant special effect and the second pendant special effect to the video images, a more vivid visual effect of the video image of the two terminals can be achieved, so that fun of video communication can be enriched, thereby meeting a more personalized user experience of the user.

The first terminal may download specific special effect parameters corresponding to the pendant special effects when a pendant special effect function is used for the first time, so that when the special effect is added, the special effect parameters can be directly obtained locally from the terminal to add the special effect, thereby increasing an adding speed. Certainly, when using the pendant special effect function, the first terminal may further download only icons of the pendant special effects. Only when a selection operation of the user on any one special effect icon is detected, a special effect parameter of the selected pendant special effect is downloaded, to avoid a waste of traffics and storage spaces.

Because the pendant special effect needs to be added to a corresponding location on the face in the video image, the first terminal further needs to first obtain a facial coordinate through the following step 306, and then add the pendant special effect based on the facial coordinate through the following step 307.

306: The first terminal obtains facial coordinates of the video images of the two terminals.

In one embodiment of this application, the first terminal and the second terminal can obtain the facial coordinates through any one of the following manners:

For a first implementation, the participating terminals of video communication can respectively extract facial coordinates of their own video images. This step may be: performing, by the first terminal, facial recognition on the video image of the first terminal, to obtain a facial coordinate of the video image of the first terminal; performing, by the second terminal, facial recognition on the video image of the second terminal, to obtain a facial coordinate of the video image of the second terminal; and transmitting, by the first terminal, the facial coordinate of the video image of the first terminal to the second terminal, so that the second terminal receives the facial coordinate of the video image of the first terminal, and the first terminal receives the facial coordinate, obtained by the second terminal through facial recognition, of the video image of the second terminal.

The step of performing, by the first terminal, facial recognition on the video image of the first terminal, to obtain a facial coordinate of the video image of the first terminal can be: extracting, by the first terminal, facial coordinates of all organs in the face from the video image of the first terminal through a preset facial recognition algorithm; obtaining a facial coordinate of an organ matching the first pendant special effect from the extracted facial coordinates; and taking the facial coordinate of the organ matching the first pendant special effect as the facial coordinate of the video image of the first terminal. Certainly, the procedure of obtaining the facial coordinate through facial recognition may be further a procedure of roughly recognizing a facial contour, to obtain a facial coordinate used for representing the facial contour. Because general locations of five sense organs on the face are relatively fixed, the facial contour can be used as a reference of adding the special effect, so that when the special effect is added, a calculation load of the terminal can be also reduced.

In a video chat session of the first terminal and the second terminal, the organ matching the first pendant special effect in the video image of the first terminal may move, so that the facial coordinate of the organ also changes accordingly. Therefore, the first terminal further needs to update the facial coordinate in real time, and this procedure can be: obtaining, by the first terminal, the facial coordinate of the organ matching the first pendant special effect through the foregoing step at intervals of a preset period; and taking the currently obtained facial coordinate as the facial coordinate of the video image of the first terminal. The preset period may be set and modified based on a user requirement. This is not specifically limited in one embodiment of this application. For example, the preset period may be 0.2 seconds, 0.01 seconds or the like.

For a second implementation, the terminal extracts the facial coordinates respectively through the video images of the two terminals. This step may be: respectively performing, by the first terminal, facial recognition on the video images of the two terminals, to obtain the facial coordinates of the video images of the two terminals. The implementation of this step is consistent with the implementation of obtaining the facial coordinate of the video image of the first terminal in the first implementation, which is not described herein again.

307: The first terminal respectively adds the two pendant special effects to corresponding locations of the video images of the two terminals based on the facial coordinates of the video images of the two terminals.

Figure 5:
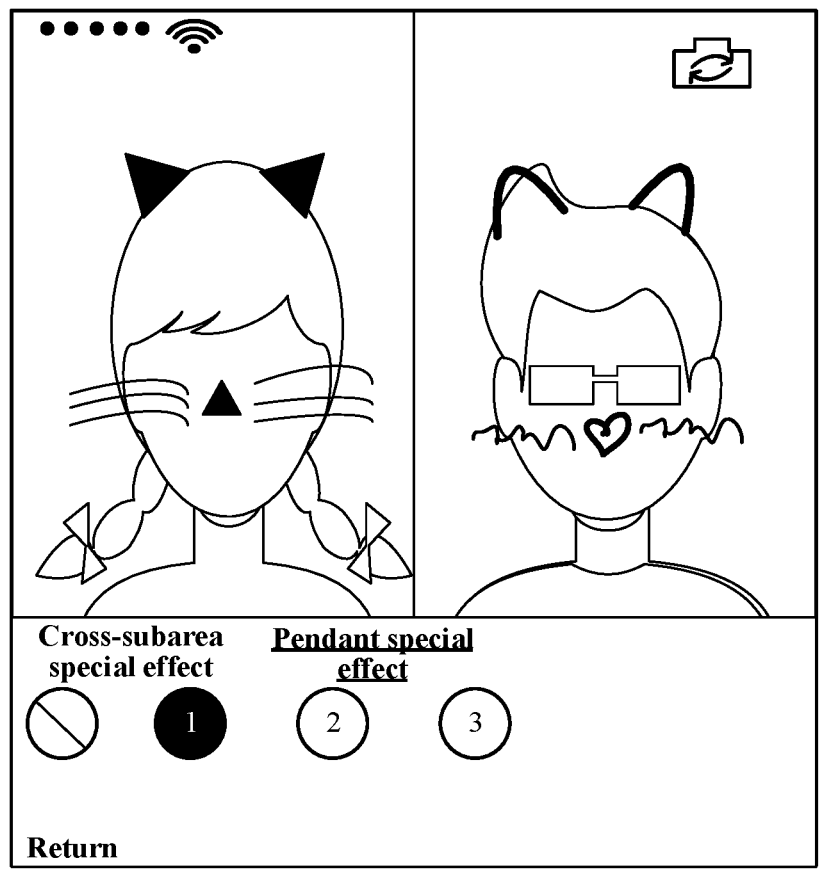
FIG. 5 is a schematic diagram of a pendant special effect according to an embodiment of this application.

In this step, that the first terminal adds the first pendant special effect to the video image of the first terminal is used as an example. The first terminal draws, on the video image of the first terminal, a pendant special effect layer used for adding the first pendant special effect, and adds, in the pendant special effect layer, the first pendant special effect to a location of the facial coordinate according to the facial coordinate of the organ matching the first pendant special effect, so that the first pendant special effect in the pendant special effect layer fits the organ matching the first pendant special effect. As shown in FIG. 5, by adding the two pendant special effects for the video images of the two terminals, the video communication interface is more personalized, so that fun of video communication is improved.

In step 306, the first terminal updates the facial coordinates in real time. Therefore, in this step, after adding the first pendant special effect to the pendant special effect layer, the first terminal further adjusts the first pendant special effect in real time. This procedure can be: determining, by the first terminal at intervals of a preset period, whether the facial coordinate, obtained in a previous preset period, of the video image of the first terminal is the same as a facial coordinate corresponding to a current preset period according to the facial coordinate, obtained in the current preset period, of the video image of the first terminal. If not, the first terminal moves the first pendant special effect to a location of the facial coordinate corresponding to the current preset period, so that the first pendant special effect is in the location of the facial coordinate obtained in the current preset period; and if yes, the first terminal performs no processing. In other words, current facial coordinates of the video images of the two terminals obtained in a current period is compared with previous facial coordinates of the video images of the two terminals obtained in a previous period. Display locations of the two pendant special effects are moved according to the obtained facial coordinates of the video images of the at least two terminals when the current facial coordinates and the previous facial coordinates are different. An implementation in which the first terminal adds the second pendant special effect to the video image of the second terminal is consistent with the foregoing implementation, which is not described herein again.

In one embodiment of this application, when the first special effect display instruction is the cross-subarea special effect instruction, the first special effect is the cross-subarea special effect, and correspondingly, a step that the first terminal adds the cross-subarea special effect for the video communication interface can be implemented through the following step 308.

308: The first terminal adds a special effect with a display effect of moving from a display subarea to another display subarea to the video images of the two terminals. In some embodiments, a beginning of the moving special effect is displayed at the first display subarea and is the same for the multiple end special effects, and the target end special effect is displayed at the second display subarea.

In one embodiment of this application, the first terminal locally pre-stores a plurality of correspondences between the cross-subarea special effect instructions and the cross-subarea special effects. The cross-subarea special effects include a directly displayed special effect and a special effect with a plurality of ends based on body actions.

When the cross-subarea special effect is the directly displayed special effect, this step may be: obtaining, by the first terminal according to the cross-subarea special effect instruction, a specified moving track of the cross-subarea special effect corresponding to the cross-subarea special effect instruction from the correspondences between the cross-subarea special effect instructions and the cross-subarea special effects, the specified moving track being moving from a subarea to another subarea; drawing a cross-subarea special effect layer on the video image of the first terminal and the video image of the second terminal; and displaying a moving special effect with a moving track of moving from a display subarea to another display subarea on the cross-subarea special effect layer according to the specified moving track. For example, the cross-subarea special effect is a gold coin giving special effect in which a plurality of gold coins moves from the first display subarea to the second display subarea.

The cross-subarea special effect may be a special effect used for reflecting interaction between communication participants, and therefore, different display effects can be selected based on body actions of the participants. For example, when the cross-subarea special effect is the special effect with a plurality of ends based on the body actions, this step can be implemented through the following step 3081 and step 3082.

3081: The first terminal adds a moving special effect with the display effect of moving from a display subarea to another display subarea to the video images of the two terminals according to a moving track parameter of the cross-subarea special effect.

In one embodiment of this application, the cross-subarea special effects include a first displayed moving special effect and an end special effect based on the body actions feeding back the moving special effect. The moving track parameter of the cross-subarea special effect is used for indicating a moving track of the moving special effect in the cross-subarea special effect, and the moving track parameter includes, but is not limited to a moving track curve, a start point and an end point of a movement, or the like.

In this step, the first terminal obtains the moving track parameter corresponding to the cross-subarea special effect instruction according to the cross-subarea special effect instruction, and draws the cross-subarea special effect layer on the video image of the first terminal and the video image of the second terminal. The first terminal displays a moving special effect that moves from a display subarea to another display subarea according to the moving track curve on the cross-subarea special effect layer according to the moving track parameter, or the first terminal displays a moving special effect that moves from the start point of the movement to the end point along a straight line according to the start point and the end point of the movement on the cross-subarea special effect layer according to the moving track parameter. The moving track curve and the start point and the end point of the movement may be set and modified based on a user requirement. This is not specifically limited in this embodiment of this application.

For example, the start point of the movement may be a midpoint of a critical line of the first display subarea and the second display subarea, and the end point may be any point in an area in which the face in the second display subarea is located. The moving special effect may be a boxing special effect in which a boxing graphic moves from the start point to the area in which the face in the second display subarea is located.

For example, the moving track curve may be a track curve from a bottom of the first display subarea to a bottom of the second display subarea, and a corresponding movement may be moving a balloon graphic from the bottom of the first display subarea to the bottom of the second display subarea.

In one embodiment of this application, the first terminal transmits a cross-subarea special effect display instruction to the second terminal through step 304, and the second terminal synchronously displays the moving special effect. Therefore, in a procedure in which the first terminal displays the moving special effect, the user of the second terminal may feed back the moving special effect from the first terminal by performing different body actions, thereby further improving fun of interaction in the video chat session.

3082: The first terminal selects, among multiple end special effects, a target end special effect to be added to the video images of the two terminals according to a body action occurred in the video image of the second terminal. The multiple end special effects indicate different action results of the first special effect corresponding to different body actions. For example, the first terminal may add different end special effects to the video images of the two terminals according to different body actions in the video image of the second terminal in a display procedure of the moving special effect, the second terminal being an action recipient in the special effect and each of the end special effects being used for indicating an action end of the cross-subarea special effect.

In one embodiment of this application, body actions of different users who feed back the moving special effect are different. Therefore, in the display procedure of the moving special effect, the first terminal may add different end special effects based on different body actions.

In this step, for each of the cross-subarea special effects, the first terminal may store correspondences between different body actions and end special effects. Therefore, this step may be: determining, by the first terminal according to body actions in the video image of the second terminal as the action recipient in the special effect and the correspondences between the body actions and the end special effects, an end special effect corresponding to the body action in a procedure in which the first terminal displays the moving special effect, the end special effect being used for indicating an action end of the cross-subarea special effect; and displaying, by the first terminal, the end special effect corresponding to the body action on the cross-subarea special effect layer.

In one embodiment of this application, the first terminal may display different end special effects about whether to perform interaction in the cross-subarea special effect based on whether the body action is a preset action. Specifically, this step may be: adding, by the first terminal, a first end special effect for the video images of the two terminals after an active time length of the moving special effect ends if the first terminal detects that there is the preset action in the another display subarea, the first end special effect being used for indicating that the recipient performs interaction based on the cross-subarea special effect; and adding, by the first terminal, a second end special effect for the video images of the two terminals after the active time length of the moving special effect ends if the first terminal detects that there is not the preset action in the another display subarea, the second end special effect being used for indicating that the recipient does not perform interaction based on the cross-subarea special effect. The preset action may be an action determined based on location changes of body organs in the second display subarea. For each cross-subarea special effect, each end special effect and a preset action corresponding to the end special effect are pre-stored in the first terminal. For example, the moving special effect in the cross-subarea special effect may be the boxing special effect in which a boxing graphic moves from the start point to the area in which the face in the second display subarea is located. The preset action may be an action in which the face turns to one side.

Correspondingly, if detecting that there is the action in which the face turns to one side in the second display subarea, the first terminal determines that the face in the video image of the second terminal dodges from the boxing graphic according to the action in which the face turns to one side, that is, the recipient performs interaction based on the cross-subarea special effect, and the first end special effect is added to the video images of the two terminals. If detecting that there is not the action in which the face turns to one side in the second display subarea, the first terminal determines that the face in the video image of the second terminal does not dodge from the boxing graphic, that is, the recipient does not perform interaction based on the cross-subarea special effect, and the second end special effect is added to the video images of the two terminals.

Figure 6:
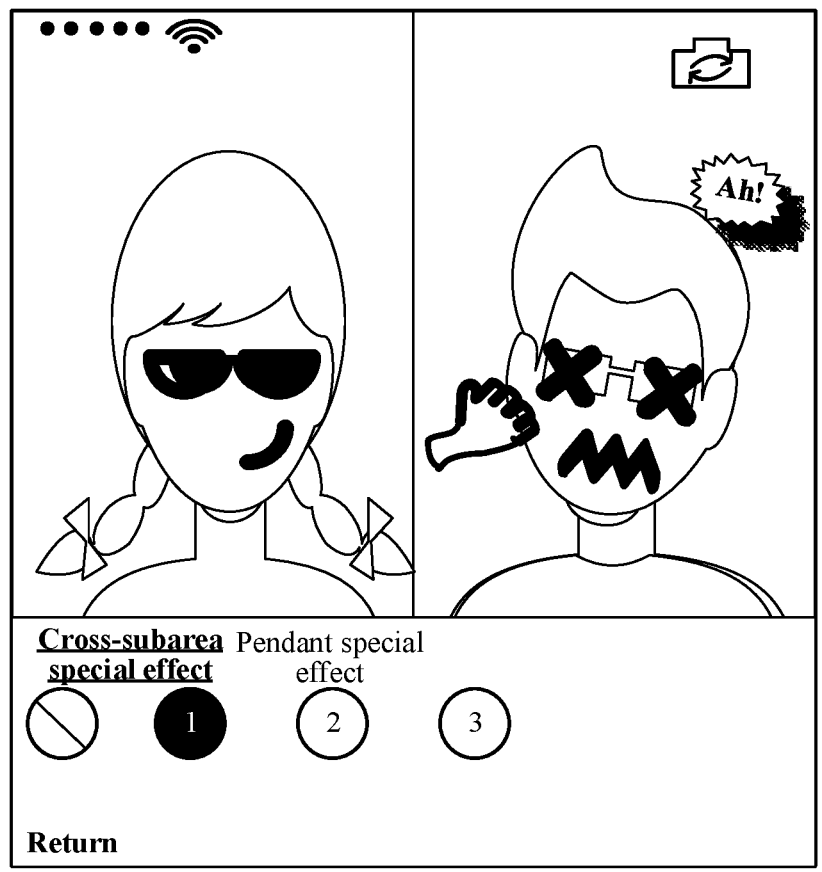
FIG. 6 is a schematic diagram of a cross-subarea special effect according to an embodiment of this application.

Further, in one embodiment of this application, the end special effect in the cross-subarea special effect may include a graphic special effect and a sound effect. For example, as shown in FIG. 6, the second end special effect may include: adding a first graphic special effect of surprised or proud to the face of the video image of the first terminal, adding a second graphic special effect of closed eyes to the face of the video image of the second terminal, and playing a sound effect of painful screaming when the face is hit in the video communication interface. Additionally, when a body action of dodging (e.g., moving the body to one side) is detected in the video image of the second terminal, the first graphic special effect may be a sad or defeated face, and the second graphic special effect may be a victory sign.

For example, the moving special effect in the cross-subarea special effect may be further a special effect in which a balloon graphic moves from the first display subarea to the second display subarea. The preset action may be an action that the user of the second terminal taps the balloon graphic with a finger. When the first terminal detects that there is the action in which the balloon graphic is tapped by a finger in the second display subarea in which the video image of the second terminal is located, the first terminal determines that the user corresponding to the second terminal as the recipient performs interaction based on the cross-subarea special effect. The first terminal obtains the first end special effect corresponding to a case that interaction is performed based on the cross-subarea special effect from a plurality of end special effects of the cross-subarea special effect. When the first terminal detects that there is not the action in which the balloon graphic is tapped by a finger in the second display subarea in which the video image of the second terminal is located, the first terminal determines that the user corresponding to the second terminal as the recipient does not perform interaction based on the cross-subarea special effect. The first terminal obtains the second end special effect corresponding to a case that interaction is not performed based on the cross-subarea special effect from the plurality of end special effects of the cross-subarea special effect.

Further, in one embodiment of this application, the end special effect in the cross-subarea special effect may include a graphic special effect and a sound effect. For example, the first end special effect may include: a graphic special effect that a victory gesture occurs in the second display subarea when the balloon is tapped, and a sound effect that explosion of the balloon is played in the video communication interface.

When adding the end special effect, the first terminal actually detects the preset action according to the facial coordinate of the video image of the second terminal; and the moving track of the moving special effect in the cross-subarea special effect may alternatively be related to the area in which the face is located. Therefore, in a procedure of adding the cross-subarea special effect, the first terminal needs to obtain the facial coordinates of the video image of the first terminal and/or the video image of the second terminal, to detect whether there is the preset action in the second display subarea or determine the moving track parameter of the moving special effect according to the facial coordinate of the video image of the second terminal. An implementation in which the first terminal needs to obtain the facial coordinates of the video image of the first terminal and/or the video image of the second terminal is consistent with the implementation of obtaining the facial coordinates that is used when the pendant special effect is added. This is not described herein again.

When the first terminal transmits the cross-subarea special effect instruction to the second terminal, the cross-subarea special effect instruction carries a special effect identifier. The second terminal may locally store cross-subarea special effects corresponding to each of the cross-subarea special effect instructions, so that the second terminal locally obtains a cross-subarea special effect corresponding to the special effect identifier according to the special effect identifier in the first special effect display instruction, adds the moving special effect, and adds different end special effects for the video images of the two terminals based on the different body actions in the video image of the second terminal in the video communication interface of the second terminal, the second terminal being the action recipient in the special effect.

Figure 7:
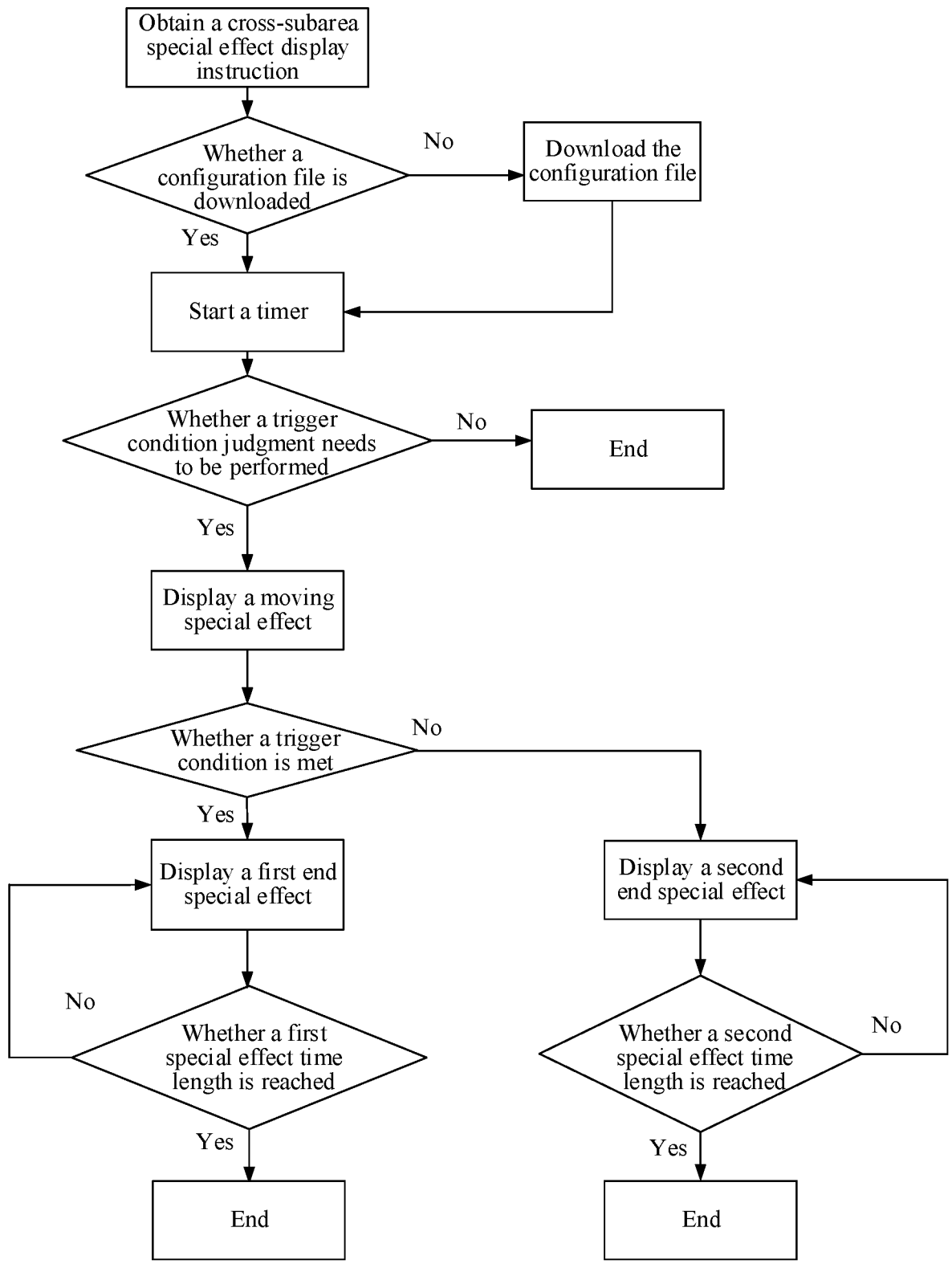
FIG. 7 is a logical flowchart of a cross-subarea special effect according to an embodiment of this application.

For the special effect with a plurality of ends based on the body actions in the cross-subarea special effects, as shown in FIG. 7, when actually implemented, the foregoing procedure may logically include the following steps a to f:

Step a: The first terminal first determines whether a configuration file of the first special effect corresponding to the first special effect display instruction is downloaded when the first terminal obtains the first special effect display instruction and before the first terminal adds the first special effect; if the configuration file is not downloaded, the first terminal first locally downloads the configuration file of the first special effect; and if the configuration file is downloaded, step b is performed.

Step b: The first terminal reads the configuration file of the first special effect according to the first special effect display instruction, and starts a timer.

Step c: Determine whether a trigger condition judgment needs to be performed on the cross-subarea special effect, that is, determine whether a current display manner in the video communication interface is the split-screen display manner. If yes, the trigger condition judgment needs to be performed, and step d is performed. If not, end.

Step d: Display the moving special effect, and determine whether a trigger condition of the cross-subarea special effect is met based on the body actions. If yes, the first end special effect is displayed based on the body actions. If not, the second end special effect is displayed based on the body actions.

Step e: Determine whether a display time length of the first end special effect reaches a first special effect time length, or determine whether a display time length of the second end special effect reaches a second special effect time length.

Step f: End when the display time length of the first end special effect reaches the first special effect time length; or, end when the display time length of the second end special effect reaches the second special effect time length.

In the foregoing procedure, detection of the preset action may be respectively and locally performed by the participating terminals in the video chat session, or may be performed by any one of the participating terminals, and a detection result is notified to other terminals. This manner of performing detection by one terminal may ensure that both parties can see a most complete and accurate effect, and significantly reduce performance consumption.

Different cross-subarea special effects may correspond to different preset actions. In one embodiment of this application, different preset actions can be set according to actual display effects of the cross-subarea special effects, and a specific setting manner is not limited.

In one embodiment of this application, the first terminal may further obtain a second special effect display instruction used for instructing to add the second special effect after adding the first special effect, and for the second special effect display instruction, the first terminal may use any one of the following processing manners:

First processing manner: the first terminal only displays one special effect. That is, if obtaining the second special effect display instruction, the first terminal cancels the first special effect added in the two display subareas, and adds the second special effect corresponding to the second special effect display instruction for the two display subareas; and when a special effect active time length of the second special effect ends, adds the first special effect for the two display subareas again.

In one embodiment of this application, if obtaining the second special effect display instruction, the first terminal cancels the first special effect by clearing the first special effect on a first special effect layer of the first special effect, or directly clearing the first special effect layer.

If the first terminal stops drawing the first special effect on the first special effect layer, the first terminal directly draws the second special effect corresponding to a second special effect instruction on the first special effect layer. When detecting that the special effect active time length of the second special effect ends, the first terminal obtains the first special effect corresponding to the first special effect display instruction again, and restores display of the first special effect on the first special effect layer. If the first terminal directly clears the first special effect layer, the first terminal draws, in the video image of the first terminal and the video image of the second terminal, a second special effect layer used for displaying the second special effect. The first terminal adds the second special effect corresponding to the second special effect display instruction based on the second special effect layer. An implementation thereof is consistent with the implementation in which the first terminal adds the first special effect, which is not described herein again.

Then, when detecting that the special effect active time length of the second special effect ends, the first terminal clears the second special effect layer, draws the first special effect layer corresponding to the first special effect again, and adds the first special effect for the video image of the first terminal and the video image of the second terminal again.

Second processing manner: the first terminal superimposes and displays the two special effects. That is, if obtaining the second special effect display instruction, the first terminal superimposes the second special effect corresponding to the second special effect display instruction for the two display subareas in which the first special effect is added.

In one embodiment of this application, if obtaining the second special effect display instruction, the first terminal superimposes the second special effect layer on the first special effect layer, obtains the second special effect corresponding to the second special effect display instruction, and displays the second special effect on the second special effect layer, to display the first special effect and the second special effect at the same time, or the first terminal may further draw the second special effect on the first special effect layer, to superimpose and display the special effects.

In one embodiment of this application, in a procedure of performing display through a split-screen display manner, the first terminal cancels the split-screen display. This step may include: obtaining, by the first terminal, a split-screen cancelation instruction of the first terminal, and displaying the video images of the two terminals through a manner of big and small pictures. In this step, the split-screen cancelation instruction is used for instructing the first terminal to interrupt the split-screen display manner, and display the video images of the two terminals through the manner of big and small pictures. The manner of big and small pictures is: the first terminal displays the video image of the first terminal in full screen, and displays the video image of the second terminal in a small size in a rectangular area in an upper right corner of the video communication interface. The first terminal may trigger the split-screen cancelation instruction through a split-screen cancelation button. In a case that the first terminal detects that the split-screen cancelation button in the video communication interface is triggered, the first terminal obtains the split-screen cancelation instruction; displays every frame of video image in first video data of the first terminal in the video communication interface in full screen; adjusts every frame of video image in second video data of the second terminal according to a size of the rectangular area; and displays the adjusted video image in the rectangular area.

In one embodiment of this application, video images of different terminals are displayed by dividing a video communication interface into a plurality of subareas that are not overlapped, which breaks through a limitation of pictures, so that in a case that a special effect is added, the special effect can be added in the plurality of subareas, and a sense of interaction is enhanced by adding the special effect, which prevents a waste of network resources of video communication, thereby greatly improving actual efficiency of video communication.

Further, by adding the special effects by using configured special effect parameters in the terminals locally, the special effects are displayed in the terminals, so that data in the interaction is greatly reduced, and a normal parsing of the video is not affected. In addition, in the foregoing video chat session, information such as the video and the facial coordinates is only exchanged in the video chat session, which reduces the performance consumption. In an entire implementation procedure of the special effect, interruption and restoration of the special effect are further supported. A new special effect can interrupt display of a current special effect, and a previous special effect may need to be restored after the current special effect ends, so that each interaction is complete, thereby ensuring a best user experience.

Figure 8:
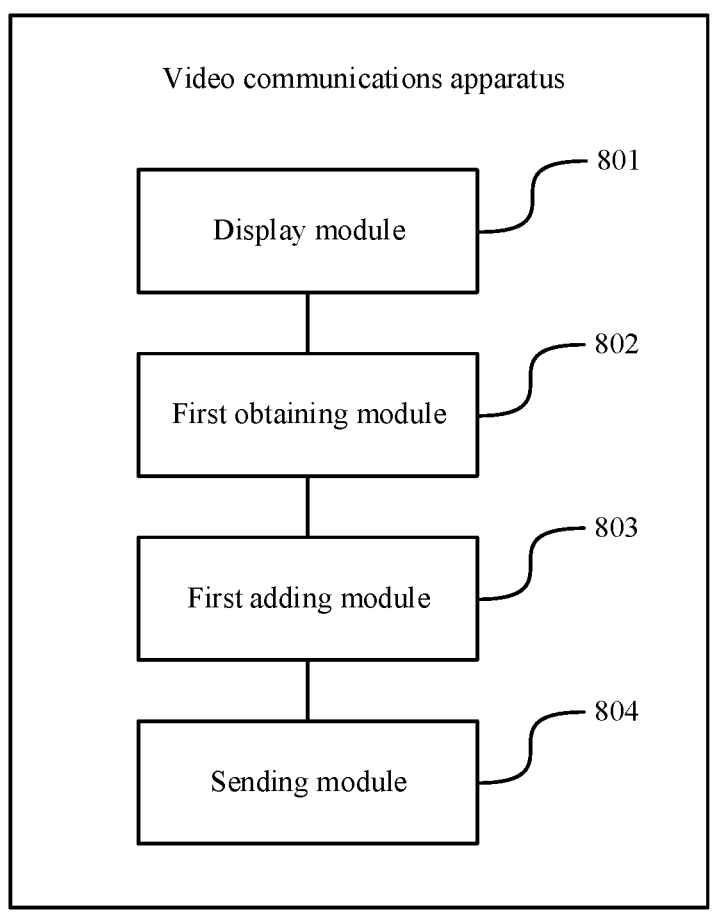
FIG. 8 is a schematic structural diagram of a video communications apparatus according to an embodiment of this application.

FIG. 8 is a schematic structural diagram of a video communications apparatus according to an embodiment of this application. The apparatus is applied to a first terminal. Referring to FIG. 8, the apparatus includes: a display module 801, a first obtaining module 802, a first adding module 803 and a transmitting module 804.

The display module 801 is configured to respectively display video images of at least two terminals in at least two display subareas of a video communication interface in a video chat session of the at least two terminals, the display subareas being not overlapped with each other. The at least two terminals includes the first terminal, and each display subarea displays a video image from one of the at least two terminals.

The first obtaining module 802 is configured to obtain a first special effect display instruction, the first special effect display instruction being used for instructing to add a first special effect for the at least two display subareas.

The first adding module 803 is configured to add the first special effect to the at least two display subareas based on the first special effect display instruction.

The transmitting module 804 is configured to transmit the first special effect display instruction to a second terminal of the at least two terminals. In some embodiments, the second terminal being an action recipient of the first special effect. In some embodiments, the apparatus is further configured to: select, among multiple end special effects, a target end special effect to be added to the video images of the at least two terminals according to a body action occurred in the video image of the second terminal, the multiple end special effects indicating different action results of the first special effect corresponding to different body actions Optionally, the apparatus further includes:

a second obtaining module, configured to obtain a split-screen display instruction triggered in the first terminal or transmitted by any second terminal; and in response to the split-screen display instruction, respectively displaying, by the first terminal, the video images of the at least two terminals in the at least two display subareas.

Optionally, the first adding module 803 includes:

a first obtaining unit, configured to obtain at least two pendant special effects corresponding to a pendant special effect instruction;

a second obtaining unit, configured to obtain facial coordinates of the video images of the at least two terminals; and a first adding unit, configured to respectively add the at least two pendant special effects to corresponding locations of the video images of the at least two terminals based on the facial coordinates of the video images of the at least two terminals. In some embodiments, each pendant special effect corresponds to one of the at least two display subareas.

Optionally, the second obtaining unit includes:

a first recognition subunit, configured to respectively perform facial recognition on the video images of the at least two terminals, to obtain the facial coordinates of the video images of the at least two terminals; or a second recognition subunit, configured to perform facial recognition on a video image of the first terminal, to obtain a facial coordinate of the video image of the first terminal, and receive a facial coordinate of a video image of the at least one second terminal, the facial coordinate being obtained by the at least one second terminal through facial recognition.

Optionally, in a case that the first special effect display instruction is a cross-subarea special effect instruction, the first special effect is a cross-subarea special effect displayed across the at least two display subareas. The cross-subarea special effect may include effects displayed across the at least two display subareas.

the first adding module 803 is further configured to add a special effect with a display effect of moving from a display subarea to another display subarea to the video images of the at least two terminals.

Optionally, the first adding module 803 includes:

a second adding unit, configured to add a moving special effect with the display effect of moving from a first display subarea to a second display subarea to the video images of the at least two terminals according to a moving track parameter of the cross-subarea special effect; and optionally, a third adding unit, configured to add different end special effects to the video images of the at least two terminals according to different body actions in the video image of the second terminal in a display procedure of the moving special effect, the second terminal being an action recipient in the special effect and each of the end special effects being used for indicating an action end of the cross-subarea special effect.

Optionally, the third adding unit includes:

a first adding subunit, configured to add a first end special effect to the video images of the at least two terminals after an active time length of the moving special effect ends in a case that it is detected that there is a preset action in the another display subarea, the first end special effect being used for indicating that a recipient performs interaction based on the cross-subarea special effect; and a second adding subunit, configured to add a second end special effect to the video images of the at least two terminals after an active time length of the moving special effect ends in a case that it is detected that there is no preset action in the another display subarea, the second end special effect being used for indicating that the recipient does not perform interaction based on the cross-subarea special effect. For example, after an active time length of the moving special effect ends, a first end special effect is added to the video images of the at least two terminals if a first body action in the second display subarea is detected when displaying of the moving special effect, the first end special effect indicating that the action recipient performs interaction based on the cross-subarea special effect; and after the active time length of the moving special effect ends, a second end special effect is added to the video images of the at least two terminals if no body action is detected in the second display subarea, the second end special effect being indicating that the recipient does not perform interaction based on the cross-subarea special effect.

Optionally, the apparatus further includes:

a cancelation module, configured to cancel the first special effect added in the at least two display subareas in a case that a second special effect display instruction is obtained;

a second adding module, configured to add a second special effect corresponding to the second special effect display instruction for the at least two display subareas; and a third adding module, configured to add the first special effect for the at least two display subareas again in a case that an active time length of the second special effect ends.

Optionally, the apparatus further includes:

a superposing module, configured to superimpose the second special effect corresponding to the second special effect display instruction for the at least two display subareas in which the first special effect is added in a case that the second special effect display instruction is obtained.

Optionally, the apparatus further includes:

a third obtaining module, configured to obtain a split-screen cancelation instruction of the first terminal, and display the video images of the at least two terminals through a manner of big and small pictures. For example, one of the video images of the at least two terminals is displayed in full screen and another one of the video images of the at least two terminals is displayed overlapping a subarea of the full screen.

Optionally, the first obtaining module 802 includes:

a third obtaining unit, configured to add a second special effect corresponding to a specified gesture upon detecting the specified gesture in both the video images displayed in the at least two display subareas, the gesture special effect instruction being used for instructing to add a special effect corresponding to the specified gesture for the video images displayed in the at least two display subareas; or a fourth obtaining unit, configured to add a third special effect corresponding to a specified emotion upon detecting the specified emotion in any one of the video images displayed in the at least two display subareas, the emotion special effect instruction corresponding to the specified emotion being used for instructing to add a special effect corresponding to the specified emotion for the video images displayed in the at least two display subareas.

Through the apparatus provided in one embodiment of this application, video images of different terminals are displayed by dividing a video communication interface into a plurality of subareas that are not overlapped, which breaks through a limitation of pictures, so that in a case that a special effect is added, the special effect can be added in the plurality of subareas, and a sense of interaction is enhanced by adding the special effect, which prevents a waste of network resources of video communication, thereby greatly improving actual efficiency of video communication.

Further, by adding the special effects by using configured special effect parameters in the terminals locally, the special effects are displayed in the terminals, so that data in the interaction is greatly reduced, and a normal parsing of the video is not affected. In addition, in the foregoing video chat session, information such as the video and the facial coordinates is only exchanged in the video chat session, which reduces the performance consumption. In an entire implementation procedure of the special effect, interruption and restoration of the special effect are further supported. A new special effect can interrupt display of a current special effect, and a previous special effect may need to be restored after the current special effect ends, so that each interaction is complete, thereby ensuring a best user experience.

Any combination of the foregoing optional technical solutions may be used to obtain an optional embodiment of the present disclosure. Details are not described herein.

The above functional modules are only described for exemplary purposes when the video communications apparatus provided by the foregoing embodiments performs video communication. In actual applications, the functions may be allocated to different functional modules according to specific needs, which means that the internal structure of the apparatus is divided to different functional modules to complete all or some of the above functions. In addition, the video communications apparatus provided in the foregoing embodiment belongs to the same conception as the embodiment of the video communications method. Refer to the method embodiment for details of the specific implementation process, which is not described herein again.

Figure 9:
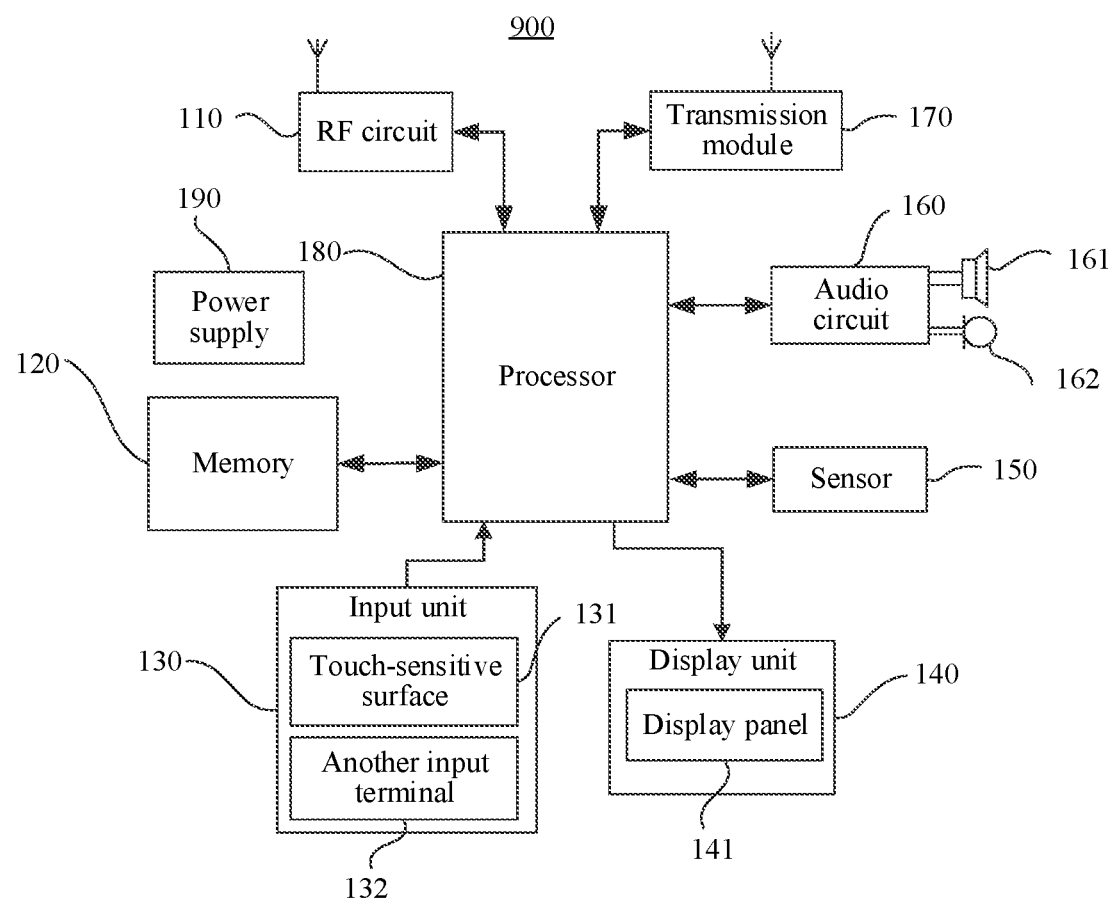
FIG. 9 is a schematic structural diagram of a terminal according to an embodiment of this application.

FIG. 9 is a schematic structural diagram of a terminal according to an embodiment of this application. The terminal may be configured to implement the functions of the terminal in the video communications method in the foregoing embodiments. Specifically:

A terminal 900 may include components such as a radio frequency (RF) circuit 110, a memory 120 including one or more computer readable storage media, an input unit 130, a display unit 140, a sensor 150, an audio circuit 160, a transmission module 170, a processor 180 including one or more processing cores, and a power supply 190. A person skilled in the technology may understand that the structure of the terminal shown in FIG. 9 does not constitute a limitation to the terminal, and the terminal may include more or fewer components than those shown in the figure, or some components may be combined, or a different component deployment may be used.

The RF circuit 110 may be configured to receive and transmit signals during an information receiving and transmitting process or a call process. Particularly, the RF circuit 110 receives downlink information from a base station, then delivers the downlink information to the one or more processors 180 for processing, and transmits related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another terminal by wireless communication. The wireless communication may use any communications standard or protocol, which includes, but is not limited to, GSM (Global System for Mobile communications), GPRS (General Packet Radio Service), CDMA (Code Division Multiple Access), WCDMA (Wideband Code Division Multiple Access), LTE (Long Term Evolution), e-mail, SMS (Short Messaging Service), and the like.

The memory 120 may be configured to store a software program and a module, for example, a program instruction and a module corresponding to a terminal shown in the foregoing exemplary embodiments, and the processor 180 performs various functional applications and data processing by running the software program and the module stored in the memory 120, for example, implements video-based interaction. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 900, and the like. In addition, the memory 120 may include a high speed random access memory, and may also include a non-volatile memory such as at least one magnetic disk storage device, a flash memory, or another volatile solid-state storage device. Correspondingly, the memory 120 may further include a memory controller, to provide access of the processor 180 and the input unit 130 to the memory 120.

The input unit 130 may be configured to: receive input digit or character information, and generate a keyboard, mouse, joystick, optical, or track ball signal input related to the user setting and function control. Specifically, the input unit 130 may include a touch-sensitive surface 131 and another input terminal 132. The touch-sensitive surface 131, which is also referred to as a touchscreen or a touch panel, may collect a touch operation of a user on or near the touch-sensitive surface (such as an operation that is performed by a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 180. Moreover, the touch controller can receive and execute a command transmitted from the processor 180. In addition, the touch-sensitive surface 131 may be a resistive, capacitive, infrared, or surface acoustic wave type touch-sensitive surface. In addition to the touch-sensitive surface 131, the input unit 130 may further include the another input terminal 132. Specifically, the another input terminal 132 may include, but is not limited to, one or more of a physical keyboard, a functional key (such as a volume control key or a switch key), a track ball, a mouse, and a joystick.

The display unit 140 may be configured to display information entered by the user or information provided for the user, and various graphical user interfaces of the terminal 900. These graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although in FIG. 9, the touch-sensitive surface 131 and the display panel 141 are used as two separate parts to implement input and output functions, in some embodiments, the touch-sensitive surface 131 and the display panel 141 may be integrated to implement the input and output functions.

The terminal 900 may further include at least one sensor 150, for example, an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal device 400 is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal 900 is not described herein again.

The audio circuit 160, a loudspeaker 161, and a microphone 162 may provide audio interfaces between the user and the terminal 900. The audio circuit 160 may transmit, to the loudspeaker 161, an electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 transmits the audio data to, for example, another terminal by using the RF circuit 110, or outputs the audio data to the memory 120 for further processing. The audio circuit 160 may further include an earplug jack, to provide communication between a peripheral earphone and the terminal 900.

The terminal 900 may help, by using the transmission module 170, a user to receive and transmit an email, browse a web page, and access stream media, and the like, which provides wireless or wired broadband Internet access for the user. Although FIG. 9 shows the transmission module 170, it may be understood that the transmission module 170 is not a necessary component of the terminal 900, and when required, transmission module 170 may be omitted as long as the scope of the essence of the present disclosure is not changed.

The processor 180 is a control center of the terminal 900, is connected to various parts of the entire mobile phone by using various interfaces and lines, and by running or executing a software program and/or module stored in the memory 120 and invoking data stored in the memory 120, perform various functions of the terminal 900 and process data, so as to perform overall monitoring on the mobile phone. Optionally, the processor 180 may include one or more processor cores. Preferably, the processor 180 may integrate an application processor and a modem. The application processor mainly processes an operating system, a user interface, an application program, and the like. The modem mainly processes wireless communication. It may be understood that the foregoing modem processor may not be integrated into the processor 180.

The terminal 900 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other component.

Although not shown in the figure, the terminal 900 may further include a camera, a Bluetooth module, and the like, and details are not described herein. Specifically, in one embodiment, the display unit of the terminal 900 is a touchscreen display, and the terminal 900 further includes a memory and one or more programs. The one or more programs are stored in the memory, and are configured to be executed by one or more processors to execute instructions, included in the foregoing one or more programs, used to perform the operations performed by the terminal in the foregoing embodiments.

In an exemplary embodiment, a computer readable storage medium storing a computer program is further provided, for example, a memory storing a computer program. The computer program, when executed by a processor, implements the video communications method in the foregoing embodiment. For example, the computer readable storage medium may be a read-only memory (ROM), a random access memory (RAM), a compact disc read-only memory (CD-ROM), a magnetic tape, a floppy disk, an optical data storage device, or the like.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A video communications method, applied to a first terminal, the method comprising:
   respectively displaying video images of at least two terminals in at least two display subareas of a video communication interface in a video chat session of the at least two terminals, wherein the at least two terminals includes the first terminal, and each display subarea displays a video image from one of the at least two terminals;
   obtaining a first special effect display instruction, the first special effect display instruction including a cross-subarea special effect instruction;
   adding a first special effect to the at least two display subareas based on the first special effect display instruction, comprising:
      adding, in response to the cross-subarea special effect instruction, a cross-subarea special effect of moving from a display subarea to another display subarea to the video images of the at least two terminals;
   transmitting the first special effect display instruction to a second terminal of the at least two terminals, the second terminal being an action recipient of the first special effect; and
   selecting, among multiple end special effects, a target end special effect to be added to the video images of the at least two terminals according to a body action occurred in the video image of the second terminal, the multiple end special effects indicating different action results of the first special effect corresponding to different body actions.

2. The method according to claim 1, further comprising:
   obtaining a split-screen display instruction triggered in the first terminal or transmitted by any second terminal; and
   in response to the split-screen display instruction, respectively displaying, by the first terminal, the video images of the at least two terminals in the at least two display subareas.

3. The method according to claim 1, further comprising:
   obtaining at least two pendant special effects corresponding to a pendant special effect instruction;
   obtaining facial coordinates of the video images of the at least two terminals; and
   respectively adding the at least two pendant special effects to corresponding locations of the video images of the at least two terminals based on the facial coordinates of the video images of the at least two terminals, each pendant special effect corresponding to one of the at least two display subareas.

4. The method according to claim 3, wherein adding the at least two pendant special effects to the at least two display subareas further comprising:
   comparing current facial coordinates of the video images of the at least two terminals obtained in a current period with previous facial coordinates of the video images of the at least two terminals obtained in a previous period; and
   moving display locations of the at least two pendant special effects according to the obtained facial coordinates of the video images of the at least two terminals when the current facial coordinates and the previous facial coordinates are different.

5. The method according to claim 3, wherein obtaining facial coordinates of the video images of the at least two terminals comprising:
   respectively performing facial recognition on the video images of the at least two terminals, to obtain the facial coordinates of the video images of the at least two terminals; or
   performing facial recognition on a video image of the first terminal, to obtain a facial coordinate of the video image of the first terminal, and receiving a facial coordinate of a video image of the at least one second terminal, the facial coordinate being obtained by the at least one second terminal through facial recognition.

6. The method according to claim 1, wherein adding a cross-subarea special effect of moving from a display subarea to another display subarea to the video images of the at least two terminals comprises:
   adding a moving special effect of moving from a first display subarea to a second display subarea to the video images of the at least two terminals according to a moving track parameter of the cross-subarea special effect.

7. The method according to claim 6, further comprising:
   after an active time length of the moving special effect ends,
      adding a first end special effect to the video images of the at least two terminals if a first body action in the second display subarea is detected when displaying of the moving special effect, the first end special effect indicating that the action recipient performs interaction based on the cross-subarea special effect; and
      adding a second end special effect to the video images of the at least two terminals if no body action is detected in the second display subarea, the second end special effect being indicating that the recipient does not perform interaction based on the cross-subarea special effect.

8. The method according to claim 1, after the adding the first special effect for the at least two display subareas, further comprising:

canceling the first special effect added in the at least two display subareas in response to obtaining a second special effect display instruction;

adding a second special effect corresponding to the second special effect display instruction to the at least two display subareas; and adding the first special effect for the at least two display subareas again when an active time length of the second special effect ends.

9. The method according to claim 2, further comprising:
obtaining a split-screen cancelation instruction of the first terminal, and displaying one of the video images of the at least two terminals in full screen and displaying another one of the video images of the at least two terminals overlapping a subarea of the full screen.

10. The method according to claim 1, the obtaining a first special effect display instruction comprising:
adding a second special effect corresponding to a specified gesture upon detecting the specified gesture in both the video images displayed in the at least two display subareas; or
adding a third special effect corresponding to a specified emotion upon detecting the specified emotion in any one of the video images displayed in the at least two display subareas.

11. The method according to claim 1, wherein obtaining a first special effect display instruction comprising:
generating the first special effect display instruction according to a voice instruction.

12. The method according to claim 1, before adding the first special effect for the at least two display subareas, further comprising:
detecting whether a configuration file is stored in the first terminal, the configuration file being used for configuring the first special effect corresponding to the first special effect display instruction; and
downloading the configuration file to the first terminal upon detecting that the configuration file is not stored in the first terminal.

13. A first terminal comprising a processor and a memory, the memory storing at least one instruction for being executed by the processor to perform:
respectively displaying video images of at least two terminals in at least two display subareas of a video communication interface in a video chat session of the at least two terminals, wherein the at least two terminals includes the first terminal, and each display subarea displays a video image from one of the at least two terminals;
obtaining a first special effect display instruction, the first special effect display instruction including a cross-subarea special effect instruction;
adding a first special effect to the at least two display subareas based on the first special effect display instruction, comprising:
adding, in response to the cross-subarea special effect instruction, a cross-subarea special effect of moving from a display subarea to another display subarea to the video images of the at least two terminals;
transmitting the first special effect display instruction to a second terminal of the at least two terminals, the second terminal being an action recipient of the first special effect; and
selecting, among multiple end special effects, a target end special effect to be added to the video images of the at least two terminals according to a body action occurred in the video image of the second terminal, the multiple end special effects indicating different action results of the first special effect corresponding to different body actions.

14. The terminal according to claim 13, wherein adding a cross-subarea special effect of moving from a display subarea to another display subarea to the video images of the at least two terminals comprises:
adding a moving special effect of moving from a first display subarea to a second display subarea to the video images of the at least two terminals according to a moving track parameter of the cross-subarea special effect.

15. The terminal according to claim 14, wherein the processor is further configured to perform: after an active time length of the moving special effect ends,
adding a first end special effect to the video images of the at least two terminals if a first body action in the second display subarea is detected when displaying of the moving special effect, the first end special effect indicating that the action recipient performs interaction based on the cross-subarea special effect; and
adding a second end special effect to the video images of the at least two terminals if no body action is detected in the second display subarea, the second end special effect being indicating that the recipient does not perform interaction based on the cross-subarea special effect.

16. The terminal according to claim 13, wherein the processor is further configured to perform: after the adding the first special effect for the at least two display subareas, canceling the first special effect added in the at least two display subareas in response to obtaining a second special effect display instruction;
adding a second special effect corresponding to the second special effect display instruction to the at least two display subareas; and
adding the first special effect for the at least two display subareas again when an active time length of the second special effect ends.

17. The terminal according to claim 13, wherein the processor is further configured to perform:
obtaining a split-screen display instruction triggered in the first terminal or transmitted by any second terminal;
in response to the split-screen display instruction, respectively displaying, by the first terminal, the video images of the at least two terminals in the at least two display subareas.

18. The terminal according to claim 13, wherein the obtaining a first special effect display instruction comprises:
adding a second special effect corresponding to a specified gesture upon detecting the specified gesture in both the video images displayed in the at least two display subareas; or
adding a third special effect corresponding to a specified emotion upon detecting the specified emotion in any one of the video images displayed in the at least two display subareas.

19. The terminal according to claim 17, wherein the processor is further configured to perform:
obtaining a split-screen cancelation instruction of the first terminal, and displaying one of the video images of the at least two terminals in full screen and displaying another one of the video images of the at least two terminals overlapping a subarea of the full screen.

20. A non-transitory computer-readable storage medium, storing at least one instruction, the instruction being loaded and executed by a processor of a first terminal to perform:

respectively displaying video images of at least two terminals in at least two display subareas of a video communication interface in a video chat session of the at least two terminals, wherein the at least two terminals includes the first terminal, and each display subarea displays a video image from one of the at least two terminals;

obtaining a first special effect display instruction, the first special effect display instruction including a cross-subarea special effect instruction;

adding a first special effect to the at least two display subareas based on the first special effect display instruction, comprising:
- adding, in response to the cross-subarea special effect instruction, a cross-subarea special effect of moving from a display subarea to another display subarea to the video images of the at least two terminals;

transmitting the first special effect display instruction to a second terminal of the at least two terminals, the second terminal being an action recipient of the first special effect; and selecting, among multiple end special effects, a target end special effect to be added to the video images of the at least two terminals according to a body action occurred in the video image of the second terminal, the multiple end special effects indicating different action results of the first special effect corresponding to different body actions.

* * * * *